United States Patent [19]
Bentem et al.

[11] Patent Number: 6,100,209
[45] Date of Patent: Aug. 8, 2000

[54] GLASS FRIT

[75] Inventors: Geert Klaas Bentem, Le Geleen, Netherlands; Peter Trenton Bishop, Reading, United Kingdom; Jonathan Charles Shepley Booth, Reading, United Kingdom; David Lawrence Gavin, Reading, United Kingdom; Detlef Rehorek, Scheulder, Netherlands

[73] Assignee: Johnson Matthey Public Limited Company, London, United Kingdom

[21] Appl. No.: 09/098,964

[22] Filed: Jun. 18, 1998

[30] Foreign Application Priority Data

Jun. 23, 1997 [GB] United Kingdom .................. 9713169

[51] Int. Cl.$^7$ ................ C03C 4/00; C03C 8/02; C03C 8/18; C03C 17/00; B05D 1/38
[52] U.S. Cl. ................ 501/19; 501/14; 501/17; 427/163.1; 427/165; 427/279; 427/286; 427/374.7; 427/383.5; 427/419.4; 65/60.4
[58] Field of Search ................ 427/163.1, 165, 427/279, 286, 287, 374.7, 376.2, 383.5, 419.4; 501/14, 17, 19; 65/60.4, 60.2

[56] References Cited

U.S. PATENT DOCUMENTS

| | | | |
|---|---|---|---|
| 3,967,973 | 7/1976 | Francel et al. | 106/183 |
| 4,333,861 | 6/1982 | Aoki et al. | 252/518 |
| 4,623,389 | 11/1986 | Donely et al. | |
| 4,837,383 | 6/1989 | Andrews | 427/108 |
| 4,959,270 | 9/1990 | Hasegawa | 428/426 |
| 5,045,509 | 9/1991 | Kiefer | 501/59 |
| 5,141,798 | 8/1992 | Chaumonot et al. | |
| 5,250,475 | 10/1993 | Zybell et al. | |
| 5,281,560 | 1/1994 | Francis et al. | 501/15 |
| 5,350,718 | 9/1994 | Anquetil et al. | |

FOREIGN PATENT DOCUMENTS

| | | |
|---|---|---|
| 0 761 617 A1 | 3/1997 | European Pat. Off. . |
| 761617 | 3/1997 | European Pat. Off. . |
| 1130324 | 10/1968 | United Kingdom . |

OTHER PUBLICATIONS

"Hydrogen–induced formation of colloids of arsenic, antimony, and bismuth in oxide glasses*";.
M. R. Tuzzolo et al., *Journal of Non–Crystalline Solids*, 143 (1992) 181–190.
UK Search Report for GB 9713169.2, Dated: Sep. 15, 1997 (priority application).

*Primary Examiner*—Shrive Beck
*Assistant Examiner*—Michael Barr
*Attorney, Agent, or Firm*—Ratner & Prestia

[57] ABSTRACT

A glass frit is prepared by heating an initial glass frit in the presence of a reducing agent so as to reduce metal moiety in the glass structure of the frit and then cooling the reaction mixture. Preferably, the frit prepared is used in a method of forming electrically conducting silver tracks on enamel on glass windows, by applying to window glass an enamel composition containing the frit and on top thereof a silver composition in the shape of the tracks and firing the compositions, such that on the firing the reduced metal moiety reduces silver ions migrating through the enamel composition from the silver composition to elemental silver and thereby prevents or impairs them from interacting with the glass to form visible tracks.

18 Claims, No Drawings

GLASS FRIT

This invention relates to a glass frit, a process for preparing a glass frit, an enamel composition containing a glass frit and a method of forming enamel on glass using the enamel composition.

BACKGROUND OF THE INVENTION

In the automotive industry, a silver composition is applied to window glass and fired to form electrically conductive silver tracks on the glass. These tracks are used particularly on rear, and less often on front or side, windows to provide a de-mister. Current is usually distributed through individual conductor tracks by means of a wider silver strip, termed a bus bar, at the edges of the window.

In order to protect the adhesive used to glue windows into the motor vehicle body from being degraded by ultra-violet light, and also for aesthetic and other purposes, an enamel layer, usually black or grey, is provided around the edges of the window. It has become common to provide the silver bus bars on the enamel so as to obscure them from view from outside the vehicle. This, however, is not as effective as is desired. On firing the silver composition and enamel composition to form the silver tracks and enamel, silver ions tend to migrate from the silver composition through the enamel composition into the glass-enamel interface where they tend to become visible after reaction with reducing species present in the glass. This is manifested by a dark amber colour, which is particularly noticeable in bright sunlight, or sometimes by a blue colour, particularly when viewed through green or blue glass. The effect is undesired and numerous proposals have been made for overcoming the problem. For instance, it has been proposed to incorporate reducing agents into the enamel composition used to form the enamel, so that on firing, the reducing agents react with the migrating silver ions, reducing them to elemental silver to prevent or impair them from interacting with the glass to form visible tracks—see for instance U.S. Pat. No. 5,141,798. Enamels formed from enamel compositions containing reducing agents, however, can still form a blue colour under the bus bar, and this is particularly evident when green or blue glass is employed; green or blue glass is increasingly being employed to decrease the infra-red transmission of the glass, but the blue colouration is evident also with clear glass at high firing times and temperatures. Large amounts of the reducing agents can be required to obscure the silver tracks, and this can be expensive or lead to disadvantages, for instance undesired colour shades. Incorporating a reducing agent dilutes the effect of the pigment employed in the enamel composition to provide the colour to the enamel layer. The reducing agent can adversely affect the acid resistance of the enamel. A different approach is shown by U.S. Pat. No. 5,250,475 and U.S. Pat. No. 5,350,718. U.S. Pat. No. 5,250,475 discloses black glass paste comprising ground, sulphide or polysulphide modified lead borosilicate glass which has 0.1 to 12% by weight—based on borosilicate glass—of sulphides and/or polysulphides fused therein, 10 to 35% by weight of black ground inorganic pigments and 15 to 25% by weight of a carrier medium. U.S. Pat. No. 5,350,718 discloses a glass frit essentially free of lead for forming an enamel capable of preventing $Ag^+$ migration, said glass frit comprising 15 to 70% by weight zinc oxide, 15 to 40% by weight silicon dioxide and 5 to 25% by weight boron trioxide and containing dissolved in said glass 0.05 to 15 mol % of at least one member of the group consisting of sulphur and sulphides. The frits of these two specifications are prepared by fusing together the frit components including the sulphur moieties. This process is not as controlled as is desirable. In addition, during the heating, sulphur may not be incorporated or sulphur or hydrogen sulphide may be liberated, eg by reaction of water—hydrogen sulphide is toxic and has a bad smell. The frit containing sulphur moieties also has disadvantages. Its thermal expansion coefficient is not an appropriate match to that of the window glass to which the enamel composition is applied. In addition, the frit tends to cause brown or black silver sulphide stains by reaction of the enamel with the overlying silver.

A need exists for an alternative way of obscuring the silver tracks. An object of the present invention is to meet this need. A need exists for an improved enamel composition, both for this use and for other applications to glass. An object of the present invention is to meet this need also.

SUMMARY OF THE INVENTION

Accordingly, the invention provides a process for preparing a glass frit, which process comprises heating an initial glass frit in the presence of a reducing agent so as to reduce metal moiety in the glass structure of the frit and then cooling the reaction mixture.

Especially, the invention provides a process for preparing a glass frit suitable for use in enamel compositions for preventing or impairing the migration of silver ions through the enamel composition on firing, which process comprises heating an initial glass frit in the presence of a reducing agent so as to reduce metal moiety of the glass structure of the frit and then cooling the reaction mixture, the reduced metal moiety being capable of reducing, to elemental silver, silver ions migrating through the enamel composition on firing.

The invention provides also a glass frit which is free from sulphur moieties and which has been treated so as to reduce metal moiety of its glass structure.

Especially, the invention provides also a glass frit which is free from sulphur moieties and which has been treated so as to reduce metal moiety of its glass structure, the reduced metal moiety being capable of reducing, to elemental silver, silver ions migrating through an enamel composition containing the frit on firing.

The invention also provides an enamel composition for glass, which composition comprises pigment and the present glass frit (ie the novel glass frit or the glass frit prepared by the present process).

Especially, the invention also provides an enamel composition for glass windows, which composition is for obscuring, from view through the glass window, electrically conducting silver tracks formed on the enamel on the other side of the glass, the composition comprising pigment and the present glass frit.

The invention provides also a method of forming enamel on glass by applying to glass an enamel composition and firing the composition, wherein the composition is the present enamel composition.

Especially, the invention provides also a method of forming electrically conducting silver tracks on enamel on glass windows, by applying to window glass an enamel composition and on top thereof a silver composition in the shape of the tracks and firing the compositions, in which method the enamel composition is the present enamel composition, such that on the firing the reduced metal moiety reduces silver ions migrating through the enamel composition from the silver composition to elemental silver and thereby prevents or impairs them from interacting with the glass to form visible tracks.

UK specification 1130324 discloses a process for preparing a composition of solid matter comprising intermixed glass and metal sintered together, wherein at least one compound containing metal is reduced to metal in situ in a mixture of such compound with particles of glass and the mixture is subjected to sintering conditions during and/or subsequent to such reduction. There is no mention, however, of heating a glass frit, nor of reducing metal moiety of the glass structure of the frit, nor of any enamel composition, nor of the present method of obscuring silver tracks.

The present method produces an extremely good result, especially for obscuring silver tracks in the use discussed above. Because the reduced metal moiety is in the glass of the frit, preferably dispersed throughout it, the reduced metal moiety is well placed to meet the silver ions migrating through the enamel composition on firing, compared to the situation in which the reducing agents are admixed with a frit. A good dispersion is obtained because the reduced metal moiety is derived from metal moiety which is part of the atomic structure of the frit. Thus, compared to metal incorporated as an additive, it is much more efficient as a reactant. In addition, the use of a reducing agent such as boron to reduce the frit in accordance with the present invention results in an enamel of better acid resistance than the corresponding one made by employing the same reducing agent in the enamel composition. It has also been found that the use of a reducing agent, eg boron, to reduce the frit in accordance with the present invention enables the silver to be obscured using less of the reducing agent than when the same reducing agent is employed instead in the enamel composition. In other cases, reducing agents, eg sodium oxalate, can be employed to reduce the frit in accordance with the present invention to obscure the silver but are ineffective when employed instead in the enamel composition. The present enamel composition does not require a reducing agent to be added, which would dilute the effect of the pigment. The present enamel composition is also advantageous for uses on glass besides obscuring silver tracks. The composition fires well and produces a good enamel of surprisingly high opacity. The present process for preparing a glass flit is advantageous in that it is readily controlled. One starts with an initial frit of definite composition and can control the reduction to achieve the desired extent of reduction. The reduced metal moiety is better dispersed than when carrying out the reduction while forming a frit at all from its components—this often results in the reduced metal moiety agglomerating badly, for instance to lumps of metal.

The present process comprises heating an appropriate glass frit in the presence of a reducing agent and then cooling. The reduced metal moiety, especially that which is capable of reducing silver ions migrating through the enamel composition on firing, is derived from the interconnecting elements in the glass itself. The initial glass flit which is heated usually contains at least one of the following constituents: bismuth oxide, lead oxide, antimony oxide, titanium dioxide, arsenic oxide and cadmium oxide; usually in a total content of 5–70, preferably 15–60, especially 35–55, % by weight. Other constituents such as silica, titania, boric oxide, alumina, lanthanum oxide, zirconia, ceria, tin oxide, magnesia, calcium oxide, strontium oxide, lithium oxide, sodium oxide and potassium oxide can be employed to optimise the desired physical properties of the frit, for instance so that the thermal expansion matches that of the glass, especially window glass, substrate. Because of toxicity perceptions, lead oxide, arsenic oxide and cadmium oxide are preferably avoided. Bismuth oxide, optionally plus titanium dioxide, is preferably present. The present metal is preferably bismuth. The initial frit can be prepared in the usual way, by melting components together and then quenching, for instance by pouring into water.

The initial glass frit is modified in the present process; the metal moiety in the glass structure is reduced to the reduced metal moiety. The glass structure of the initial glass frit must clearly contain metal moiety capable of this reduction. The metal moiety is reduced to a lower oxidation state. This may be the zero oxidation state (ie the reduced moiety is metal itself). Where there is one, this may alternatively be an intermediate oxidation state. Preferably the reduced metal moiety is present throughout the glass frit, not only on its surface; it can be seen that dispersion throughout the flit better places the reduced metal moiety to have its effect, especially to encounter migrating silver ions. The reduced metal moiety may be in the form of colloidal particles. The present frit is normally much darker in colour than the initial frit.

The present process involves reducing metal moiety in the initial glass frit. The higher the reduction temperature, the faster the reduction. On the other hand, at the higher temperatures sintering tends to occur to form lumps, which may then need to be broken down. The reduction is preferably carried out at a temperature below the melting point of the frit. To alleviate the need for grinding, it is preferred that the reduction be performed at a temperature below the softening point of the frit, especially at a temperature within 100° C., particularly 50° C., either side of its glass transition temperature (Tg). The temperature is preferably above the Tg. For powder starting materials, lower temperatures may be appropriate than for more bulky starting materials. These temperature desirerata apply particularly in the case of the reduced moiety being reduced bismuth moiety.

The reducing agent can be gaseous, for instance methane, ammonia, sulphur dioxide or carbon monoxide, but especially hydrogen. Pure hydrogen gas is not necessary; for safety, a gas containing hydrogen in amount up to 5% is preferably employed, for instance a mixture of 5% hydrogen and 95% nitrogen.

The reducing agent is conveniently solid, for instance carbon, sugar (preferably sucrose, for instance in the form of cane sugar), boron, iron, aluminium, bismuth, antimony, wood, hay, flour, rice, cellulose, sodium oxalate, ferrous oxalate, zinc, tin, tin(II) oxide, manganese, molybdenum, boron carbide, copper, chromium, vanadium, nickel, molybdenum disilicide, sodium thiosulphate or aluminium boride. Sulphur has been found to be ineffective. Wood, hay, flour, rice or sugar have each been found to be particularly good reducing agents, especially sugar.

The reducing agent can be liquid, for instance an aqueous solution of sodium thiosulphate, an aqueous solution of glucose and KOH, a solution (eg in toluene or xylene) of an alkyl or aryl thiolate, liquid paraffin, or molten tartaric acid. The reducing agent can be a solution or dispersion of a suitable polymer in an organic carrier. Such solution can be a medium used in the production of screen printing inks, for instance an IR drying medium such as medium 650–63 (which is a solution in pine oil and which is commercially available from Cookson Matthey BV, Holland) or a UV curing medium. The solution can alternatively be such a UV curing medium which has been cured.

The reducing agent can be a plurality of reducing agents.

The reduction treatment is carried out for long enough to form the desired product. Using hydrogen at 85 to 95% of the Tg in ° C., for instance, a time of 2 hours is often appropriate, though some degree of silver hiding is obtained using a shorter time.

After the reduction treatment, the glass frit can be milled, eg by jet or ball milling, if appropriate before employing it in an enamel composition.

The glass frit prepared by the present process contains reduced metal moiety, for example bismuth. The frit contains enough of the reduced metal moiety to be effective, especially in preventing or impairing the migrating silver ions from forming visible tracks. For this purpose, the frit usually contains at least 1%, preferably at least 5%, by weight of the reduced metal moiety. All or some of the metal moiety from which the reduced metal moiety is derived may be thus reduced (providing that the glass structure remains intact so that the product is a glass frit). For instance, the frit may contain up to 30% by weight of the reduced metal moiety, for example when this is reduced bismuth moiety. Thus, the frit may contain for instance 1–30% by weight of the reduced metal moiety.

Preferably the present process is performed such that the glass frit prepared is free from sulphur moieties. Such preferred frits are advantageous. Their thermal expansion coefficients match more closely that of glass, particularly window glass, to which their enamel compositions are applied, and their absence of sulphur moieties avoids any problem of causing brown or black silver sulphide stains by reaction of the enamel with the overlying silver in the method of obscuring silver tracks. The reduced frits which are free from sulphur moieties are novel materials and the invention provides them as such. It is known from Journal of Non-Crystalline Solids 143, (1992), 181–190 to treat glass containing arsenic, antimony or bismuth with hydrogen at temperatures within the glass transformation region to form a dark coloured layer at the surface of the glass body. The treated glass, however, is not a frit.

Conventionally, an enamel composition comprises pigment and a glass frit. The present enamel composition is analogous. The composition usually contains 70–95% by weight glass frit comprising the present glass frit and 5–30% by weight pigment, based on the total weight of these two ingredients.

The present enamel composition can contain additional frit besides the present frit.

When using the enamel composition to obscure silver tracks, it has been found that sometimes the tracks are still somewhat evident because of changes in the crystalline structure of the present frit; consequently it is preferred to use frits which are less prone to crystallising, or the present frit admixed with a frit which is less prone to crystallising.

The enamel composition can contain added reducing agent, in order to reduce the silver migration even further. Preferably, however, the enamel composition contains no added reducing agent. The composition can contain other additives, for instance $SnO_2$.

The pigment in the enamel composition can be conventional. In a preferred aspect of the present invention, the reduction of the initial glass frit is performed in the presence of pigment employed in the enamel composition. This is advantageous not only when the enamel composition is used for obscuring silver tracks but also when it is used otherwise on glass, in particular because it surprisingly enhances opacity and improves firing. It also results in less ghosting. Ghosting is the phenomenon encountered in obscuring silver tracks in which the part of the enamel composition between the silver composition and the glass is to some extent protected from the heat in firing and hence does not fire as well, resulting in a tendency to show the shape of the tracks. Heating the initial frit with only the pigment is not as advantageous as heating it in the presence also of reducing agent in the present process. Thus, preferably glass frit in the present enamel composition has been prepared by the reduction in the presence of pigment and the pigment in the composition comprises, and preferably consists of, that employed in the process. In the reduction in the presence of pigment, the pigment is preferably employed in a weight of 2–50, especially 5–35, particularly 10–20, % based on the total weight of initial frit and pigment.

Preferably the pigment in the enamel composition is dark coloured, especially black, grey or brown, particularly black. It has been found that in the present invention, sometimes the enamel composition can give a slight reddish brown hue. This is believed to be caused by reaction of the present frit with copper in black pigments. Accordingly, in a preferred embodiment, the black pigment is free from copper moieties. The pigment can contain cobalt moieties, though because of expense, it preferably does not.

Enamel compositions are conventionally applied in a carrier medium to glass. The present composition is analogous, and can be used in the conventional way. The present composition is applied to glass, for instance float glass. The present glass can be appliance glass, for instance glass used in domestic appliances, such as glass doors of ovens or glass shelves of refrigerators. Preferably, however, the present glass is automotive glass. The composition can be used for printing a decoration onto a glass article, preferably a glass window, especially of a vehicle. Application can be carried out by screen printing.

Preferably the present enamel composition is applied to window glass to obscure silver tracks. On such enamel composition, usually after drying or curing the enamel composition, a silver composition in the shape of the tracks can be applied. The silver composition, usually a paste, can be conventional and can be applied, for instance by screen printing, in the usual way. The silver composition usually comprises solids portion in a carrier medium. The solids portion usually contains 10–99.5 weight % elemental silver or silver precursor which is converted to elemental silver on firing. The solids portion can contain 0.01–15 weight % boron to reduce silver migration even further. The solids portion can contain 0–85 weight % of glass frit. The carrier medium is the vehicle for applying the solids portion, and is no longer present after firing. The composition contains generally 5–95% by weight of the solids portion. The carrier medium may contain solid particles of resin, but these are removed in the firing and do not count towards the solids portion.

The silver composition may be dried before a separate firing stage, for instance where the composition is to be overprinted or the product is to be stored before firing.

The silver composition and the enamel composition are fired in the same firing, for instance at 540–800° C., for instance at 760° C., for 2–20, for instance 2, minutes. Advantageously, the window glass is bent in the firing of the silver composition, usually to the desired curved shape of a window.

The window is preferably that of a vehicle.

On firing, silver in the +1 valency state is usually very mobile in the enamel composition, migrating through it by ion exchange with components thereof. In the present invention, the silver ions are reduced by the reduced metal moiety in the molten frit to elemental silver, which is relatively static in the system and which hence is impaired or prevented from reaching the glass to interact therewith to form visible tracks.

The invention is illustrated by the following Examples.

EXAMPLE 1A AND COMPARATIVE EXAMPLE 1B

A bismuth-containing glass frit available from Cookson Matthey Ceramics plc under the designation B5236MF (Glass transition temperature 460° C.) was heated in a tube furnace under a flowing gas atmosphere of 5% hydrogen 95% nitrogen. The temperature was ramped up at 10° C. per minute to 400° C. and then held for two hours. The gas atmosphere was then kept constant until the material had cooled to 200° C. Before this reduction heat treatment, the frit was white in appearance. Afterwards it was black. 10 g of the reduced frit, after ball-milling to a B.E.T. surface area of approximately $3m^2g^{-1}$, was mixed with 3.33 g of a black copper chromite pigment and 4 g of an IR ink medium based on pine oil and available from Cookson Matthey Ceramics plc under the designation 456–63. The components were triple-roll-milled to form a paste and printed onto a float glass substrate to form a layer approximately 27 $\mu$m thick. After drying this, a silver paste was printed over areas of the black paste. The silver paste had the composition, by weight:

- 70% silver powder within the particle size range of 0.1–0.8 micron, and having an average particle size of 0.6–0.7 micron; the sizes being measured by scanning electron microscope (SEM);
- 10% silver flake of B.E.T. surface area $1.3–2.1m^2g^{-1}$ and of particle size 4–5 $\mu$m as measured visually from SEM;
- 2% lead-based frit available from Cookson Matthey Ceramics plc under the designation 5263F; and
- 18% IR printing ink available from Cookson Matthey Ceramics plc under the designation 578–63.

The glass was then fired at 760° C. for 2 minutes and force cooled as in a glass toughening process.

On visual inspection in bright light, no evidence of colloidal silver having migrated through the black enamel could be detected. A corresponding sample (Example 1B) made with the same frit which had not been treated in the hydrogen nitrogen gas stream showed significant colloidal silver had migrated through the black enamel and into the glass, when viewed through the glass substrate.

EXAMPLE 2

A black obscuration enamel paste was produced using a similar procedure to that of Example 1, but in order to change the physical properties of the enamel, the reduced frit was mixed with an un-reduced frit. The composition of the enamel was:

- 8 g reduced frit of Example 1, 2 g of a zinc-containing, lead- and bismuth-free, frit available from Cookson Matthey Ceramics plc, Holland under the designation B5299F, 3.33 g of a nickel chrome black pigment available from Shepherd, UK under the designation black 376 and 4 g of a printing medium available from Cookson Matthey Ceramics plc, Holland under the designation 456–63.

The paste was printed onto float glass at a thickness of approximately 27 micron. After drying, a strip of silver paste (that of Example 1) was over-printed. The glass was fired at 760° C. for 2 minutes and force cooled.

On inspection as in Example 1, no evidence of colloidal silver having migrated through the black enamel could be detected. Because of the additional flit, the fired enamel had a dark glossy appearance indicating very little crystallisation. This was quite different from the enamel produced in Example 1 which had a matt, lighter, colour which is characteristic of crystalline non-stick enamels.

EXAMPLE 3A AND COMPARATIVE EXAMPLE 3B 50 g of a bismuth borosilicate frit, commercially available from Cookson Matthey plc, Holland, under the product name B5236MF, was mixed with 0.25 g of elemental amorphous boron powder (Johnson Matthey Alfa) and ball-milled for one hour without addition of solvents. The resultant mixture was heated to 500° C. at a 50° C./minute heating rate and kept at this temperature for one hour. After cooling to room temperature, the product was ball-milled again to give a powder with a particle size of ca 10–12 $\mu$m.

A screen-printable paste (Example 3A) was made from 42 g of this treated frit powder, 8 g of a bismuth zinc borosilicate frit B5317F, commercially available from Cookson Matthey plc, Holland, 20 g of copper chromite black pigment and 17 g of a screen-printing oil 456–63 (Cookson Matthey plc, Holland) by carefully mixing the powder and the oil followed by triple-roll-milling. For comparison, a second paste (Example 3B) was made by the same route but instead of the treated frit a mixture of 41.75 g of the untreated frit B5236MF and 0.25 g of the elemental amorphous boron powder was used.

The two pastes were screen-printed onto the tin-side of 3 mm float glass of size 200×300 $m^2$ using a 77T screen. The thickness of the printed later was ca 26 $\mu$m in the wet stage. After drying at 140° C., the enamel layer was overprinted with a silver paste AG073, commercially available from Cookson Matthey plc, Holland.

The glass plate was then fired at 720° C. (furnace setting) for 120 seconds. In the case of paste 3B, the silver overprint was still clearly visible from the glass side whereas in the case of paste 3A, the overprinted silver paste was hardly visible from the glass side.

EXAMPLE 4A AND COMPARATIVE EXAMPLE 4B 50 g of a bismuth borosilicate frit, commercially available from Cookson Matthey plc, Holland under the product name GB160AF, was mixed with 2.5 g of sodium oxalate (Aldrich) and ball-milled for one hour without addition of solvents. The resultant mixture was heated to 500° C. at a 50° C./minute heating rate and kept at this temperature for one hour. After cooling to room temperature, the product was ball-milled again to give a powder with a particle size of ca 10–12 $\mu$m. 42 g of this treated frit powder, 14 g of copper chromite pigment and 14 g of UV-curable medium 660–70, commercially available from Cookson Matthey plc, Holland, were mixed and triple-roll-milled to give a screen printing paste (Example 4A). For comparison, a second paste (Example 4B) was made by the same route except for using a mixture of 39.5 g of the untreated frit GB160AF and 2.5 g of the finely ground sodium oxalate in place of the treated frit powder.

As described in Example 3, the two pastes were printed on glass, overprinted with silver paste, dried, and fired at 720° C.

For paste 4B, the silver overprint was clearly visible from the glass side. The surface of the enamel was very rough due to foam formation during the firing process. In contrast, sample 4A showed good silver hiding with an acceptable enamel surface.

EXAMPLE 5

68 g of a bismuth borosilicate frit, commercially available from Cookson Matthey BV, Holland, under the trade name B5236MF, 17 g of Bi-free zinc borosilicate frit, commercially available from Cookson Matthey BV, Holland, under the trade name JS 1215AF and 15 g of nickel iron chromite black pigment, also commercially available from Cookson Matthey BV, Holland, are mixed with 10 g of cane sugar and heated at 525° C. for 2 hours. After cooling, the product was ball-milled to give a powder with a particle size of ca 10–12 μm, 50 g of this powder was then mixed with 14 g of UV-curable medium 660–70, commercially available from Cookson Matthey BV, Holland, and triple-roll milled to give a screen-printing ink. As described in Example 3, this paste was printed on glass, cured with UV light, overprinted with silver paste, dried and fired at 720° C. After firing the silver overprint was not visible from the glass side.

EXAMPLE 6

90 g of bismuth-containing zinc borosilicate frit, commercially available from Cookson Matthey BV, Holland, under the trade name JS450AF, was mixed with 10 g nickel iron chromite black pigment and 10 g of cane sugar. The mixture was kept at 525 ° C. for 2 hours and ball-milled to a particle size of ca 10–12 μm. A paste was made from this powder and IR screen-printing oil 456–63 (Cookson Matthey BV, Holland). This paste was printed on glass, dried, overprinted with silver paste and fired at 720° C. A dark black colour with no silver overprint visible from the glass side was produced.

EXAMPLES 7–18

Various alternative solid and liquid reducing agents have been tested. In each case (except in the case of medium 650–63, where 35% was used) 5% by weight of the reducing agent was added to frit B5236MF, which :, described in Example 3A, mixed and placed in a furnace. The furnace was heated to 475° C. at 10° C. per minute, held at this temperature for 1 hour and allowed to cool to ambient temperature.

After this firing, the colour of the product was noted. As a general rule, the darker/blacker the colour of the product the greater has been the reduction, although carbon residues can cause errors in this means of measurement. Accordingly, selected products were subjected to simultaneous thermal analysis to determine the levels of reduced species in the frit and carbon residues; the products selected were those from the hay, sugar and medium 650–63 reductions.

The Table shows the results in descending order of darkness/blackness of the product.

It can be seen that under these specific conditions wood, hay, medium 650–63, flour, sugar and rice are particularly good reducing agents.

It should be noted that greater levels of reduction and removal of any carbon residue could probably be obtained by optimising the firing conditions for each frit and reducing agent.

TABLE

| Example | Reducing agent | Additional information | Colour of frit after firing | Simultaneous thermal analysis | |
|---|---|---|---|---|---|
| | | | | % weight loss due to carbon residues being oxidised to gaseous species | % weight gain due to re-oxidation of reduced species |
| 7 | Wood, in the form of sawdust | | black | | |
| 8 | Hay, in the form of ground chinchilla food | | black | 2.3% | 0.325% |
| 9 | IR Drying Medium 650-63, commercially available from Cookson Matthey BV, Holland | A uniform paste was formed between the frit and reducing agent before heating. 35% of the reducing agent was employed for this. | black | 1.16% | 0.78% |
| 10 | Flour | | black | | |
| 11 | Cane sugar | Product appeared much coarser than other samples | black | 0.61% | 0.56% |
| 12 | Rice | Boiled and formed into a paste first | black | | |
| 13 | Tin metal | | dark grey | | |
| 14 | Molybdenum disilicide | | dark grey | | |
| 15 | Sodium thiosulphate (solid) | | light grey | | |
| 16 | Boron | | light grey | | |
| 17 | Cellulose | Boiled out of crucible on firing | light grey | | |
| 18 | Zinc metal | | light grey | | |

What is claimed is:

1. process for preparing a glass frit adapted to be applied to a glass member (c) and also adapted to have a metallic element (a) deposited thereon wherein, upon firing of said frit, together with said metallic element and said glass member, said frit prevents migration of metallic ions from (a) to (c), which process comprises heating an initial glass frit in the presence of a reducing agent so as to reduce at least one metal moiety ion in the glass structure of said frit and then cooling said frit for subsequent deposition on said glass member, and for receiving said metallic element thereon.

2. A process for preparing a glass frit suitable for use in enamel compositions for preventing or impairing the migration of silver ions through the enamel composition on firing, adapted to be applied to a glass member (c) and also adapted to have a metallic element (a) deposited thereon wherein, upon firing of said frit, together with said metallic element and said glass member, said frit prevents migration of metallic ions from (a) to (c) which process comprises heating an initial glass frit in the presence of a reducing agent so as to reduce at least one metal moiety of the glass structure of the frit and then cooling the frit, the reduced metal moiety being capable of reducing, to elemental silver, silver ions migrating through the enamel composition on firing.

3. A process according to claim 1, wherein the reducing agent is solid.

4. A process according to claim 3, wherein the reducing agent is sucrose.

5. A process according to claim 1, wherein the reduction is performed at a temperature below the softening point of the initial frit.

6. A process according to claim 1, wherein the reduction is carried out in the presence of pigment.

7. A process according to claim 6, wherein the pigment is black pigment free from copper moieties.

8. A process according to claim 1, wherein the glass frit prepared is free from sulphur moieties.

9. A glass frit prepared by the process of claim 1.

10. A glass frit prepared by the process of claim 2.

11. A frit according to claim 9, wherein the metal is bismuth.

12. A frit according to claim 9, which contains at least 1% by weight of the reduced metal moiety.

13. An enamel composition for glass, which composition comprises pigment and a glass frit claimed in claim 9.

14. An enamel composition for glass windows, which composition is for obscuring, from view through the glass window, electrically conducting silver tracks formed on the enamel on the other side of the glass, the composition comprising pigment and a glass frit which has been prepared by a process claimed in claim 2.

15. A composition according to claim 13, wherein the pigment is black pigment.

16. An enamel composition for glass windows, which composition is for obscuring, from view through the glass window, electrically conducting silver tracks formed on the enamel on the other side of the glass, the composition comprising pigment and a glass frit which has been prepared by a process claimed in claim 6 and the pigment in the composition comprises that employed in the process.

17. A method of forming enamel on glass by applying to glass an enamel composition and firing the composition, wherein the enamel composition is as claimed in claim 13.

18. A method of forming electrically conducting silver tracks on enamel on glass windows, by applying to window glass an enamel composition and on top thereof a silver composition in the shape of said silver tracks and firing said enamel and said silver compositions, in which method the enamel composition is as claimed in claim 14, such that on firing, at least one metal moiety of said enamel composition reduces silver ions migrating through the enamel composition from said silver composition to elemental silver and thereby prevents or impairs them from interacting with the glass to form visible tracks.

* * * * *